May 7, 1963 M. BROWNSHIELD 3,088,431
DEVICE FOR INDICATING WHEEL POSITIONS AT THE
DASHBOARD OF AN AUTOMOBILE
Filed Aug. 17, 1960 2 Sheets-Sheet 2
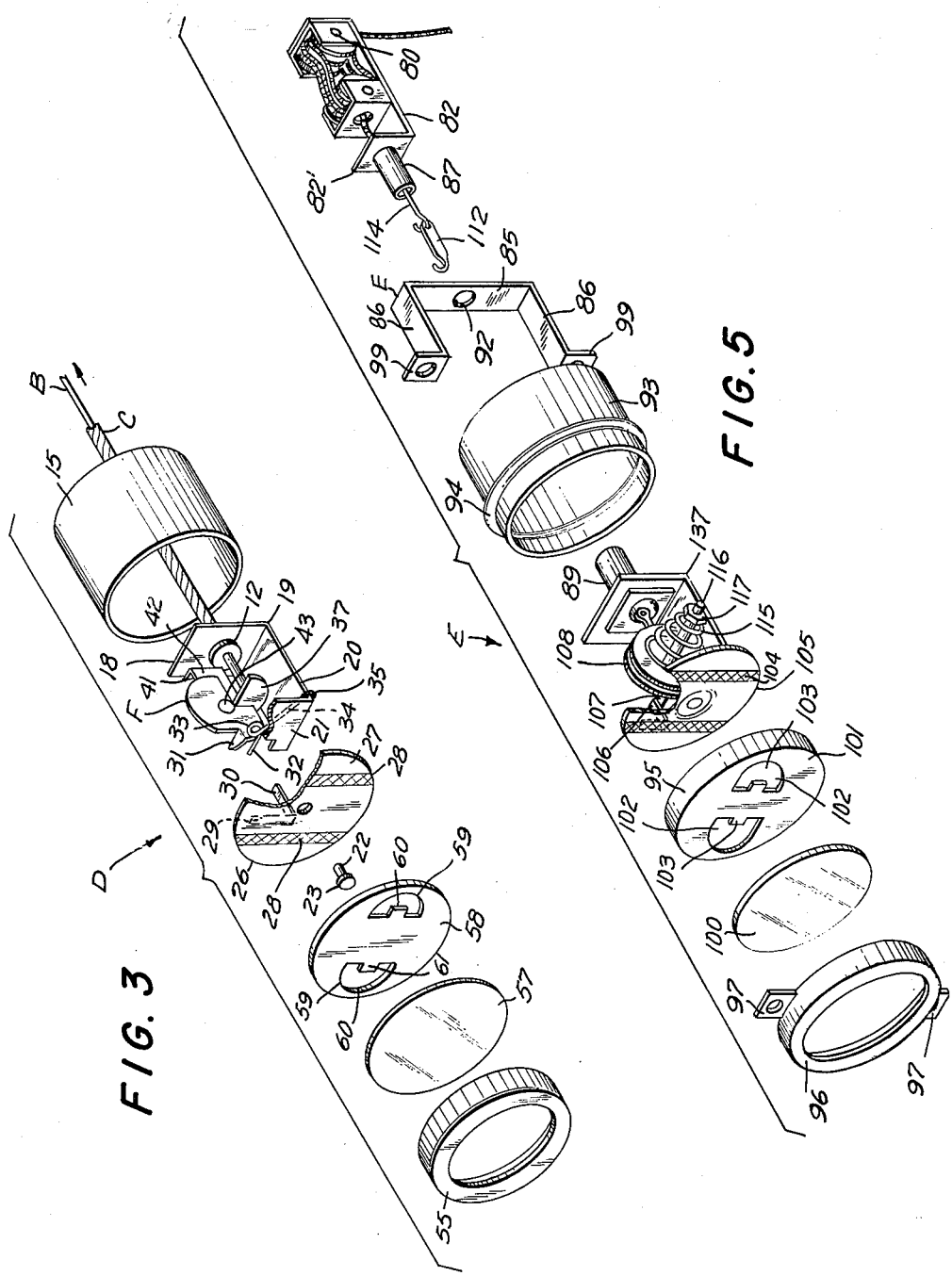
INVENTOR.
MARTIN BROWNSHIELD
BY
ATTORNEY United States Patent Office 3,088,431
Patented May 7, 1963

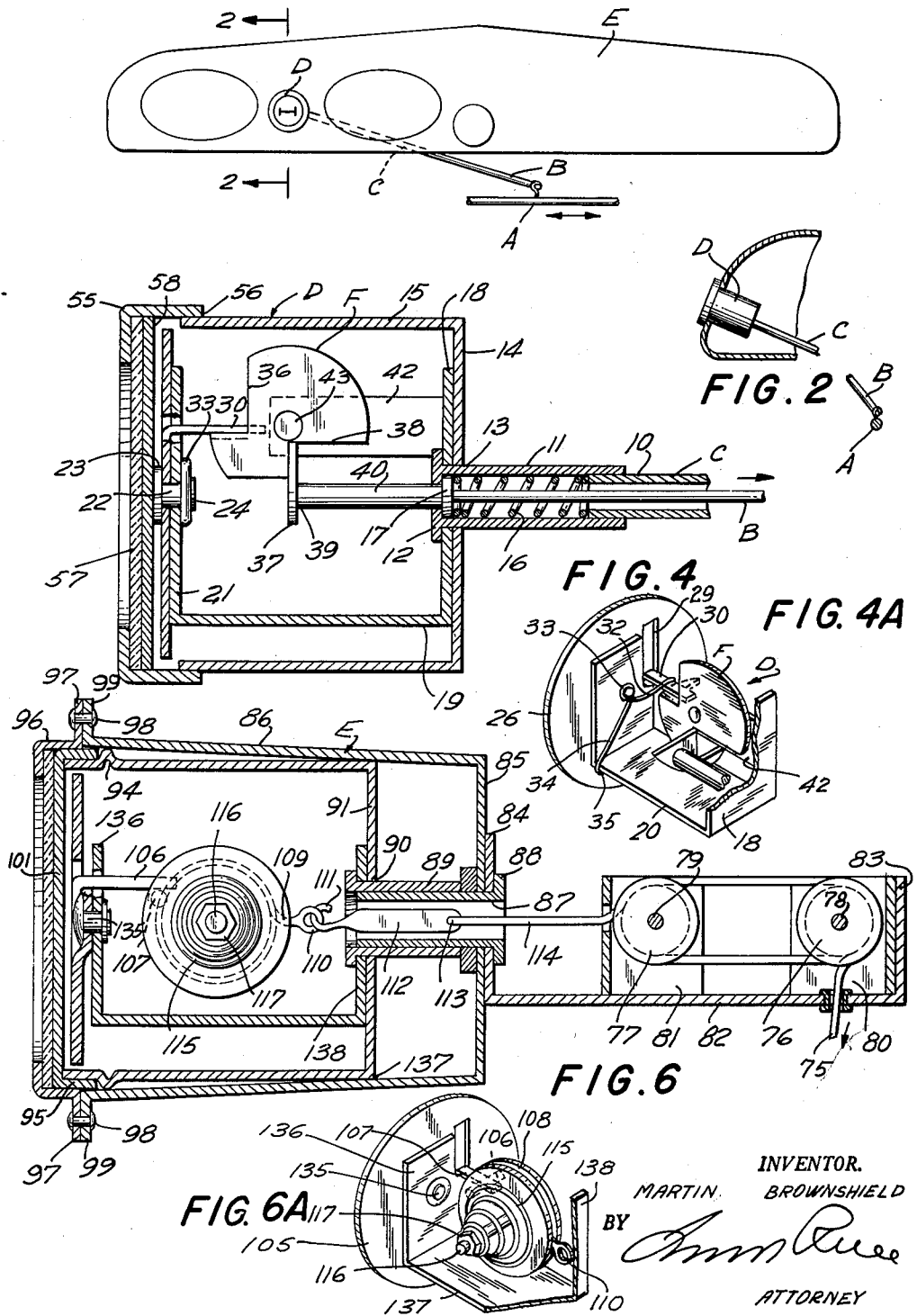

3,088,431
DEVICE FOR INDICATING WHEEL POSITIONS AT THE DASHBOARD OF AN AUTOMOBILE
Martin Brownshield, 16 S. Broadway, Dobbs Ferry, N.Y.
Filed Aug. 17, 1960, Ser. No. 50,157
2 Claims. (Cl. 116—31)

The present invention relates to a device for indicating the wheel position at the dashboard of a car.

It is among the objects of the present invention to provide a conveniently readily installed built in or accessory for automotive vehicles which may be readily mounted on the dashboard and connected to the steering mechanism for indicating the wheel position of an automotive vehicle.

It is among the other objects of the present invention to provide a simple wheel indicator device readily installed upon an automotive vehicle in operation and also readily adapted to being built in new automobiles incidental to manufacturers in which the position or direction of the front wheels may be readily ascertained from the dashboard and by the driver of the vehicle.

Another object of the present invention is to provide an aid to parking and driving in which the wheel position will be immediately observable to a driver of a vehicle, and in which the driver will be readily able to adjust his wheels before reversing or driving forwardly where his vehicle is either parked or is in closed proximity to the other cars.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable according to one preferred embodiment of the present invention to provide a communicating disk in a casing upon the dashboard.

This rotational disk on one side will be provided with a connection to a push rod or cable connected to the front wheel tie rod.

At the other side of the disk, there will be a connection to turn the indicator wheel in a casing on the dashboard to indicate the position of the front wheels.

This also may be accomplished by a cable connection, and a pulley arrangement connected to the front wheel tie rod at one end and to a rotational member which is spring biased at the other end.

The important feature of the present invention resides in the fact that the changing position of the tie rod will result in a change in rotation of an indicator disk on the dashboard by means of a motion transmitting mechanism which may consist of a disk arrangement or a pulley arrangement.

Normally, the indicator disk will have a center position to which it may be adjusted when the wheels are straight forward.

Then, the translating arrangement which will translate longitudinal motion to rotary motion will move this indicator disk to the right or to the left to indicate the wheel position.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a plan view of a dashboard of an automotive vehicle.

FIG. 2 is an enlarged transverse sectional view upon the line 2—2 of FIG. 1 showing the position of the casing upon the dashboard.

FIG. 3 is a diagrammatic exploded view of the indicator.

FIG. 4 is a transverse longitudinal sectional view of a preferred embodiment also taken upon the line 2—2 of FIG. 1 but upon enlarged scale as compared to FIGS. 1 and 2.

FIG. 4a is a perspective view on a reduced scale with parts broken away showing the operation of the disk which transmits the longitudinal movement to rotary movement.

FIG. 5 is an exploded view showing an alternative form of the invention.

FIG. 6 is a cross-sectional view illustrating the translation of the rotary movement to the disk.

FIG. 6a is partly sectional diagrammatic perspective view showing the manner of turning the indicator disk by means of the rotary arrangement.

Referring to FIGS. 1 and 2, the tie rod is diagrammatically indicated at A apart from the associated mechanism, and a connecting cable or flexible push rod is indicated as connected thereto at B.

Suitable pulley or guide arrangements are utilized to cause the movement of the cable or flexible push rod B to be transmitted through a conduit C to the instrument housing D positioned on the dashboard E of an automotive vehicle.

The preferred form of the instrument housing is shown in FIGS. 3, 4 and 4a while a modification of instrument is shown at E in FIGS. 5, 6 and 6a.

Referring to FIGS. 3, 4 and 4a, the instrument as best shown in FIG. 3 has a flexible push rod connection B to the tie wheel A which is enclosed in a conduit C.

As indicated in FIG. 4, the conduit C may have a front end portion 10 which is telescoped in the tube 11 having a head 12 which projects through an opening 13 in the back wall 14 of the cylindrical cup shaped housing 15.

In the enlarged cylindrical portion 11, the coil spring 16 will press the enlarged head 17 to the left and to what will normally be the centered position of the wheels and of the indicator.

The head 12 is held in position against the back wall 14 and the rear leg 18 of the U-shaped bracket 19.

The U-shaped bracket 19 has a base portion 20 which extends forwardly and carries at its forward end the forward leg portion 21 which carries the pivot stud 22 having an enlarged head 23 with the further rear end portion 24 engaging or holding said pivot stud 22 in position.

The pivot stud 22 (see FIGS. 3 and 4) will project through the disk 26 which has the indicator facing 27 (see FIG. 3) with the lines 28 shown in vertical position which indicates the vertical or central position of the wheels.

The facing 27 is desirably mounted upon a metal disk which has a stamped out portion 29 forming a rearwardly extending leg 30.

The leg 30 will normally rest upon the tab 31 of the disk F against which it will be pressed by the spring leg 32 (see FIG. 3).

The spring leg 32 has a central loop 33 which fits over the stud 22 inside of the flattened rear end portion 24.

The other leg 34 of the spring will have a turned over end portion 35 engaging the base 20 of the U-shaped member 19.

It will be noted that the leg 31 is stamped out of the disk F leaving the recess 36, and that at the other side of the disk, there is stamped out a quarter circular portion 37 leaving the recess 38.

This quarter circular portion is connected at 39 to the rod 40 which in turn is connected to the enlargement head 17 inside the tubular member 11.

From the rear leg 18, there is provided the angular bracket 41 having the forwardly extending flange 42 which carries the pivot 43 of the disk F.

The front end of the cylindrical casing 15 receives the bezel 55 which telescopes over the forward end of the cylindrical housing 15, and holds in position the glass facing 57, and the shield disk 58 having the cutout openings 59.

These cutout openings 59 have circular portions 60 with U-shaped projections 61 which extend across the central portions of the crisscross vertical stripes 28 which gives the impression of tire threads.

The projecting portions 60 will give the effect of observation of the associated axial or hub members so that there is conveyed to the observer or driver what appears to be a miniature duplication of the wheels of the automotive vehicle.

In operation, when the contacting members 30 and 31 are horizontal as indicated in FIGS. 3 and 4, the stripes will be vertical and the wheels will be centered.

When the cable B is moved in one direction, the disk 26 will be turned to the right or left in accordance with the change in position of the front wheels thus giving a ready indication to the driver.

Normally, the limit of the movement may be accomplished by having the rearwardly extending leg or tab 30 contact the vertical member 21 of the U-shaped bracket 19 in one direction, and by having an extension from the turned portion 37 contact the bracket 42 at the limit of movement in the opposite direction.

This convenient inexpensive device will accurately indicate the position of the front wheels of the automotive vehicle and will give an indication to the driver at all times of his front wheel position.

This enables the driver to provide against inadvertently running into or contacting other cars when he is in stopped or parked position and is about to either move forwardly or rearwardly.

It also enables the driver to move forwardly and rearwardly in close proximity to a curb or other obstructions with assurance that the movement of the vehicle will be parallel thereto and will not tend to move up upon the curb or other obstructions.

In the alternative form of the invention as shown in FIGS. 5, 6 and 6a, the flexible cable 75 attached to the tie rod will extend over the pulleys 76 and 77 having the shaft mounts 78 and 79 on the side walls 80 and 81.

The U-shaped bracket 82 has the rear legs 83 and a forward leg 84 which abuts the base 85 of the U-shaped bracket 86.

Projecting through openings 92 in the leg 84 and the base 85 of the bracket 86 is the tubular member 87 having the head 88.

The head 88 extends forwardly and has telescoped upon it a rearwardly projecting tubular member 89 which extends through the opening 90 of the rear base 91 of the cylindrical casing 93 having the enlargement 94 around the periphery thereof.

The bezel 96 which has the outwardly extending side ears 97 which may be riveted at 98 to the ears 99 of the U-shaped member 86.

Inside of the bezel 96 will be the glass cover 100, and the member 101 having the cutouts 102 which have the inturned tabs 103 to project across the stripes 104 (see FIG. 5) on the disk 105. The enlargement 94 acts as a stop for the rear flange of the member 101 (see FIGS. 5 and 6).

The disk 105 has the rearwardly extending pin 106 which contacts the pin 107 on the member 108 covering the cable 109.

The cable 109 has an eyelet 110 which engages the hook 111 at the end of the pulley bar 112.

The pulley bar 112 extends through the tubular member 87, and at its rear end 113, it is connected to the terminal cable portion 114.

The cable 109 is wrapped in the recess of the pulley wheel 108, and the conical coil spring 115 on the pivot shaft 116 will hold it against the pull of the cable 114.

The nut 117 may be used to vary the tension on the spring 115.

In operation, in the position shown in FIG. 5, the stripes 104 will be vertical with the wheels in central position, and a pull or release on the cable 75 will result in movement in one direction or the other to indicate changing position of the wheels.

The spring 32, 33, 34 may be employed, acting upon the rearwardly directed pin 106 to keep it at all times in contact with the stud or pin 107 projecting from the pulley 108.

The pivot pin 135 is carried by the forward leg 136 of the bracket 137, with the rear end 138 of the bracket being mounted against the base 91 of the cylindrical housing 93.

It is thus apparent that the applicant has provided a simple indicator device to indicate the position of the forward wheels of an automotive vehicle at the dashboard.

The cable or flexible rod B or the members 75 and 40 may have turn buckle arrangements to permit one adjustment of the indicator disks 27 and 105 so that they will be correctly vertically aligned when the wheels are centrally disposed.

The cable B instead of being connected to the front wheel tie rod may also be connected to the tie rod arm of the steering column knuckle. Only very slight movement need be communicated from the steering mechanism to the cable B which leads to the meter C.

As many changes could be made in the device for indicating wheel positions at the dashboard of an automobile, and many widely different embodiments of this invention could be made without departing from the scope of the claims, it is intended that all matter contained in the above description shall be interpreted as illustrative and not in a limiting sense.

I claim:

1. A wheel position indicator for installation upon the dashboard of an automotive vehicle of the type having a cable connection from the tie rod to the indicator, said installation comprising an indicator disk member showing the position of the wheel, an intermediate rotary member to rotate said disk member with movement of the cable and spring members to bias said disk and rotary member to central wheel position, said disk member and rotary having horizontal axes positioned in the same horizontal plane, said indicator disk member having a rearwardly projecting arm, and said axis of the intermediate rotary member being transverse to the axis of said indicator disk member, and means actuated by said cable to rotate the indicator disk member from side to side as the wheels are turned.

2. A wheel position indicator for installation upon the dashboard of an automotive vehicle of the type having a cable connection from the tie rod to the indicator, said installation comprising an indicator disk member showing the position of the wheel, an intermediate rotary member to rotate said disk member with movement of the cable and spring members to bias said disk and rotary member to central wheel position, said rotary member consisting of a second disk member having outwardly projecting tabs and the axis of the rotary member being transverse to the axis of the indicator disk member, and said indicator disk member having a rearwardly extending rod contacting one of said tabs and being moved by motion of said tab.

References Cited in the file of this patent
UNITED STATES PATENTS

| | | |
|---|---|---|
| 1,217,105 | Rodd | Feb. 20, 1917 |
| 2,707,451 | Brink | May 3, 1955 |
| 2,957,442 | Coon | Oct. 25, 1960 |